(12) United States Patent
Harvell et al.

(10) Patent No.: US 10,852,947 B2
(45) Date of Patent: Dec. 1, 2020

(54) ORGANIZATION AND COMPRESSION OF DATA IN STORAGE ARRAYS TO REDUCE CLEANING OVERHEAD

(71) Applicant: DELL PRODUCTS, L.P., Round Rock, TX (US)

(72) Inventors: Laco S. Harvell, Brookline, NH (US); Shari A. Vietry, Merrimack, NH (US)

(73) Assignee: Dell Products, L.P., Round Rock, TX (US)

( * ) Notice: Subject to any disclaimer, the term of this patent is extended or adjusted under 35 U.S.C. 154(b) by 288 days.

(21) Appl. No.: 15/606,161

(22) Filed: May 26, 2017

(65) Prior Publication Data
US 2018/0341409 A1 Nov. 29, 2018

(51) Int. Cl.
*G06F 3/06* (2006.01)
*G06F 12/00* (2006.01)
*G06F 13/00* (2006.01)

(52) U.S. Cl.
CPC ........... *G06F 3/0608* (2013.01); *G06F 3/067* (2013.01); *G06F 3/0641* (2013.01); *G06F 3/0652* (2013.01); *G06F 3/0619* (2013.01)

(58) Field of Classification Search
CPC .......... G06F 11/1471; G06F 17/30368; G06F 11/1435; G06F 2201/84; G06F 11/2094; G06F 17/30371; G06F 2201/805; G06F 2212/401; G06F 12/1009; G06F 12/0246; G06F 3/0608; G06F 3/0641; G06F 3/0652; G06F 12/00; G06F 13/00
USPC ......................................... 711/100, 114, 154
See application file for complete search history.

(56) References Cited

U.S. PATENT DOCUMENTS

| | | | |
|---|---|---|---|
| 8,417,907 B2 * | 4/2013 | Urkude | G06F 11/2097 707/610 |
| 9,892,045 B1 * | 2/2018 | Douglis | G06F 12/0833 |
| 2007/0055833 A1 * | 3/2007 | Vu | G06F 11/1469 711/162 |
| 2007/0101063 A1 * | 5/2007 | Nomoto | G06F 11/1461 711/118 |
| 2011/0185113 A1 * | 7/2011 | Goss | G06F 12/0253 711/103 |
| 2014/0258608 A1 | 9/2014 | Viswanatha | |
| 2015/0067231 A1 * | 3/2015 | Sundarrajan | G06F 3/065 711/103 |

(Continued)

*Primary Examiner* — Tuan V Thai
(74) *Attorney, Agent, or Firm* — Isidore PLLC

(57) ABSTRACT

A system and method reduces cleaning overhead in a storage array by establishing owner groups for selectively organizing memory page groups. The method generates a metadata lookup structure to correlate a disk address of the real-time data generated to a logical block address on the select storage volume. Further, the method establishes a current state of the select storage volume as a first owner group that receives reference access to the logical block address associated with the memory page group. The method selectively generates a memory snapshot of the current state of the select storage volume to form a subsequent owner group. Additionally, the method enables the first owner group and the subsequent owner group to reference the logical block address that is associated with the memory page group until a real-time data write provides a new logical block address that is associated with a new memory page group.

18 Claims, 7 Drawing Sheets

(56) References Cited

U.S. PATENT DOCUMENTS

2016/0378818 A1* 12/2016 Marcotte ............. G06F 16/2379
707/703
2018/0121364 A1* 5/2018 Edgar ................. G06F 12/1009

* cited by examiner

ORGANIZATION AND COMPRESSION OF DATA IN STORAGE ARRAYS TO REDUCE CLEANING OVERHEAD

TECHNICAL FIELD

The present disclosure generally relates to storage arrays and in particular to organizing data in storage arrays.

DESCRIPTION OF THE RELATED ART

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handlings systems may connect to independent storage systems that provide data redundancy and increased data storage. Often, a storage snapshot is created as a reference marker to identify data that was generated at a particular point in time, providing a user with accessible copies of data that can be recovered. When a snapshot is created, a new active map is generated, while reference(s) to previous maps are maintained, as needed. Maps are a metadata lookup structure that allows a storage device to translate from a remote computer disk address format to a disk location on the storage device. When deleting snapshots, typically the oldest map is the target for deletion. When a snapshot is generated, a new map is created, and subsequent writes to the storage volume are placed in the new map. When reads occur on a storage volume, the maps are searched from newest to oldest to find the most recent data. When a read occurs for a snapshot, the starting point for the map search is the map that was associated with that snapshot. This approach to data writes and reads to a storage volume is time consuming because any map may contain current data for a storage volume as well as data that has been superseded by newer writes to the volume.

When trying to recover space on a storage device, older snapshots are often deleted. These snapshots are often represented by the oldest (or last searched) maps. However, each map may have a mix of current and superseded data in it. Further, it is common to compress data in a storage device for increased economy. The common practice is to compress data in a given map into containers, where containers are generally the minimally recoverable dataspace size. Therefore, a container may include both currently active and superseded data.

BRIEF SUMMARY

Disclosed are an information handling system (IHS) and a method for selectively organizing memory page groups in a storage array. The method includes receiving a request, at a storage controller, to write real-time data to a select storage volume. The method provides the real-time data in a form of a memory page group to the select storage volume. The method further generates a metadata lookup structure, or map, to correlate a disk address of the real-time data generated to a logical block address on the select storage volume. Further, the method establishes a current state of the select storage volume as a first owner group that receives reference access to the logical block address associated with the memory page group. The method selectively generates a memory snapshot of the current state of the select storage volume to form a subsequent owner group, where the memory snapshot preserves access to the logical block address that is associated with the memory page group. Additionally, the method enables the first owner group and the subsequent owner group to reference the logical block address that is associated with the memory page group until a real-time data write provides a new logical block address that is associated with a new memory page group. Furthermore, in response to receiving the new logical block address that is associated with the new memory page group, the method assigns reference access of the original logical block address associated with the memory page group, to the subsequent owner group.

According to another embodiment, the IHS includes a storage array, a storage controller associated with the storage array, and a processor communicatively coupled to the storage controller and which executes an owner group collation utility. The processor receives a request, at a storage controller, to write real-time data to a select storage volume. The processor enables the storage controller to provide the real-time data in a form of a memory page group to the select storage volume. The processor generates a metadata lookup structure to correlate a disk address of the real-time data generated to a logical block address on the select storage volume. Further, the processor establishes a current state of the select storage volume as a first owner group that receives reference access to the logical block address associated with the memory page group. The processor selectively generates a memory snapshot of the current state of the select storage volume to form a subsequent owner group, wherein the memory snapshot preserves access to the logical block address that is associated with the memory page group. The processor further, enables the first owner group and the subsequent owner group to reference the logical block address that is associated with the memory page group until a real-time data write provides a new logical block address that is associated with a new memory page group. In response to receiving the new logical block address that is associated with the new memory page group, the processor assigns reference access of the logical block address associated with the memory page group to the subsequent owner.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
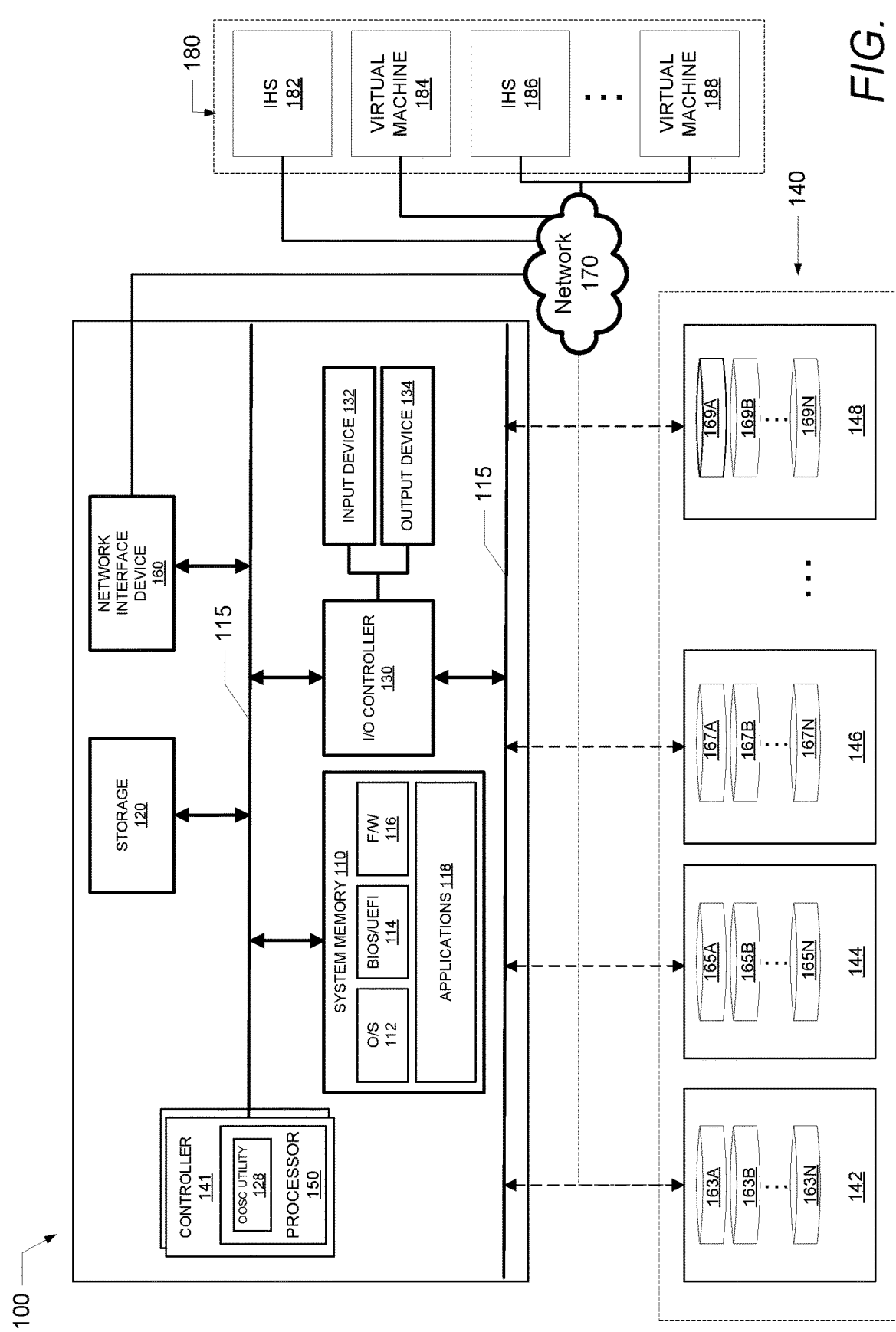
FIG. 1 illustrates an example information handling system within which various aspects of the disclosure can be implemented, according to one or more embodiments.

The illustrative embodiments provide an information handling system (IHS) and a method for selectively organizing memory page groups in a storage array. The method includes receiving a request, at a storage controller, to write real-time data to a select storage volume. The method provides the real-time data in a form of a memory page group to the select storage volume. The method further generates a metadata lookup structure, or map, to correlate a disk address of the real-time data generated to a logical block address on the select storage volume. Further, the method establishes a current state of the select storage volume as a first owner group that receives reference access to the logical block address associated with the memory page group. The method selectively generates a memory snapshot of the current state of the select storage volume to form a subsequent owner group, wherein the memory snapshot preserves access to the logical block address that is associated with the memory page group. Additionally, the method enables the first owner group and the subsequent owner group to reference the logical block address that is associated with the memory page group until a real-time data write provides a new logical block address that is associated with a new memory page group. Furthermore, in response to receiving the new logical block address that is associated with the new memory page group, the method assigns reference access to the original logical block address associated with the memory page group to the subsequent owner group.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing module, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Those of ordinary skill in the art will appreciate that the hardware, firmware/software modules, and software components and basic configuration thereof depicted in the following figures may vary. For example, the illustrative components of IHS 100 are not intended to be exhaustive, but rather are representative to highlight some of the components that are utilized to implement certain of the described embodiments. For example, different configurations of an IHS may be provided, containing other devices/components, which may be used in addition to or in place of the hardware depicted, and may be differently configured. The depicted example is not meant to imply architectural or other limitations with respect to the presently described embodiments and/or the general invention.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, there is illustrated an information handling system (IHS) 100 that is connected to a storage array 140. Example IHS 100 includes storage controller 141 which includes one or more processor(s) 150. Storage controller 141 is coupled to system memory 110 via system interconnect 115. System interconnect 115 can be interchangeably referred to as a system bus, in one or more embodiments. Also, coupled to system interconnect 115 is storage 120 within which can be stored one or more software and/or firmware modules and/or data (not specifically shown). In one embodiment, storage 120 can be hard drive or a solid state drive. The one or more software and/or firmware modules within storage 120 can be loaded into system memory 110 during operation of IHS 100. As shown, system memory 110 can include therein a plurality of software and/or firmware modules including operating system (O/S) 112, basic input/output system/unified extensible firmware interface (BIOS/UEFI) 114, other firmware (F/W) 116, and application(s) 118.

The various software and/or firmware modules have varying functionality when their corresponding program code is executed by processor(s) 150 or other processing devices within IHS 100. IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interface(s) can be associated with IHS 100. These device interface(s) can include, without limitation, an optical reader, a card reader, Personal Computer Memory Card International Association (PCMCIA) port, and/or a high-definition multimedia interface (HDMI). Device interface(s) can be utilized to enable data to be read from, or stored to, corresponding removable storage device(s), such as a compact disk (CD), digital video disk (DVD), flash drive, or flash memory card. In one or more embodiments, device interface(s) can also provide an integration point for connecting other device(s) to IHS 100.

IHS 100 further comprises a network interface device (NID) 160. NID 160 enables IHS 100 to communicate and/or interface with other devices, services, and components that are located external to IHS 100, for example, plurality of systems 180. Plurality of systems 180 include IHS 182 and 186, as well as virtual machine 184 and 188. These devices provided services and components that can interface with IHS 100 via an external network, such as example network 170, using one or more communication protocols. Network 170 can be a local area network, wide area network, personal area network, and the like, and the connection to and/or between network and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

Storage array group 140 is coupled to IHS 100 via I/O controller 130. Storage array group 140 includes storage arrays 142, 144, 146, and 148. Storage arrays 142, 144, 146, and 148 include for example, a storage disk. More specifically, storage array 142 includes a plurality of storage volumes 163A-N. Storage array 144 includes storage array 165A-N. Storage array 146 includes memory container 167A-N. Additionally, storage array 148 includes storage volume 169A-N. Processor 150 of storage controller 141 manages the movement of data and other data-related functions. Processor 150 maybe a single processor that actively manages the movement of data associated with storage array group 140, or a processor associated with each storage array, separately managing the movement of data associated with each storage array within storage array group 140.

In one embodiment, IHS 100 is a server that operates as an interface to storage array group 140 for plurality of systems 180. Plurality of systems 180 store data within a corresponding storage volume of storage array group 140. Processor 150 is communicatively coupled to at least one storage controller and executes owner organized storage compression utility (OOSC) utility 128 to reduce cleaning overhead in the storage array. Additional aspects of OOSC utility 128 and functionality associated thereof, are presented within the description of FIGS. 2-7.

Figure 2:
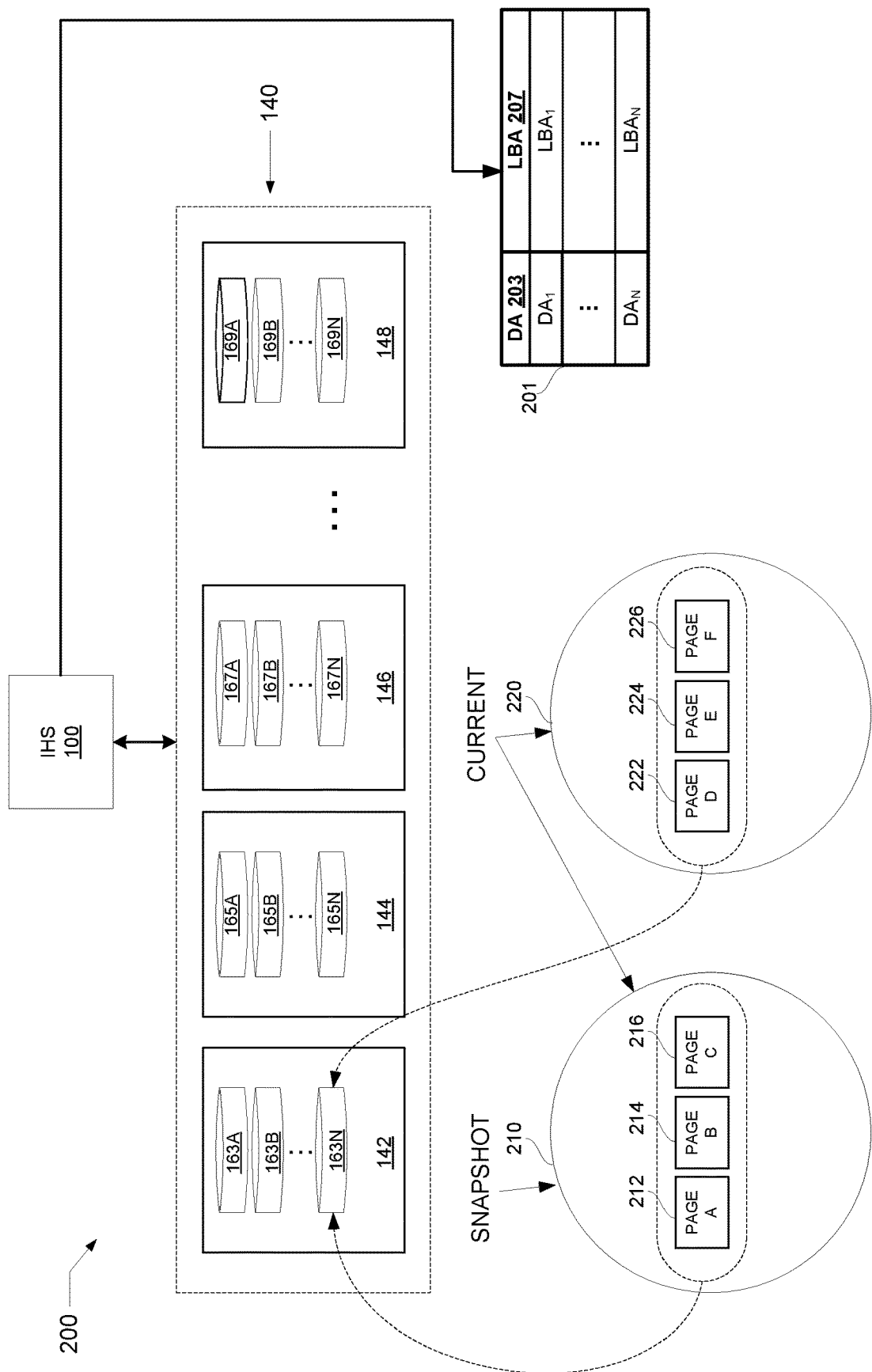
FIG. 2 illustrates, in block diagram form, the collation of memory page group reference data into like owner groups, in accordance with one embodiment.

With reference now to FIG. 2, and with continuing reference to FIG. 1, there is illustrated the collation of memory page reference data into like owner groups. Reference data collation setup 200 of FIG. 2 includes IHS 100, storage array group 140, and first and second owner group 210 and 220, respectively. Storage array group 140 includes storage arrays 142, 144, 146, and 148. Storage array 142, 144, 146, and 148 respectively include storage volume 163A-N, 165A-N, 167A-N, and 169A-N. Owner group 210 includes reference data 212, 214, and 216. Owner group 220 includes reference data 222, 224, and 226.

Virtual machine 184 is an example computer system that utilizes a select storage volume (163N) of storage array group 140 to store data. Storage arrays 142, 144, 146, and 148 are illustrated in similar proximity to each other; however, each storage array may be in a location remote to each other. In another advantageous embodiment, storage volume 163N can be at a location remote to virtual machine 184.

In an illustrative operational example, virtual machine 184 stores data on storage volume 163N utilizing a logical block addressing scheme. Storage controller 141, having OOSC utility 128 stored thereon, receives real-time data and writes the data to storage volume 163N as memory pages that form memory page groups. The memory page groups are stored at a first logical block address. Each subsequent memory page group is stored at a subsequent logical block address, thereby enabling memory page groups generated in succession to be saved in succession in storage volume 163N. Processor 150, operating according to instructions provided by OOSC utility 128, creates a metadata lookup structure 201, or map, to correlate disk address 203 of the data generated on virtual machine 184 to logical block address 207 on storage volume 163N. Storage volume 163N receives each new memory page group at a respective logical block address. A map is established in the form of an owner group to reference a respective memory page group. Owner group 220, is a current owner group and handles the mapping of real-time data writes to the active storage volume. Owner group 220 stores a plurality of reference data 212, 214, 216 associated with the respective memory page group stored in storage volume 163N. Reference data 212, 214, 216 point to the logical block address for retrieving the respective memory page group stored in storage volume 163N. At a selected point in time, processor 150 generates a snapshot of the current state of storage volume 163N, where the snapshot is an owner group. Specifically, the snapshot, in this example is owner group 210. The processor concurrently generates an active map for receiving reference data for the current real-time data writes to storage volume 163N. The active map becomes the current owner group. Owner group 220 receives "ownership" or reference access to reference data 222, 224, and 226 while concurrently retaining reference access to reference data 212, 214, and 216, because a current owner group maintains ownership of previously generated reference data until the reference data is overwritten by a real-time data write. Owner group 210 becomes a subsequent owner group having reference access to reference data 212, 214, and 216.

Figure 3:
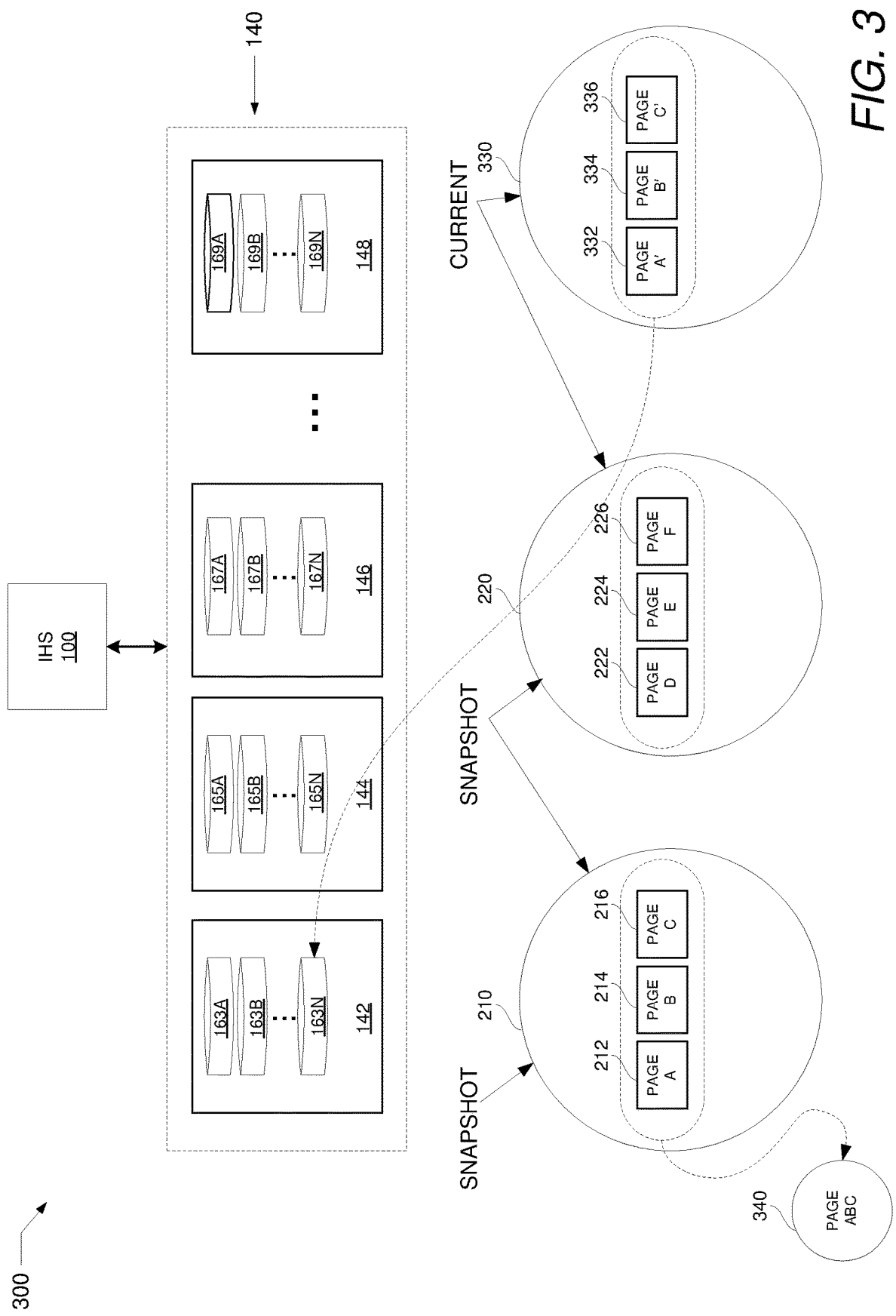
FIG. 3 illustrates, in block diagram form, the assignment of ownership for a superseded snapshot, in accordance with one embodiment.

FIG. 3, with continuing reference to FIGS. 1 and 2, illustrates, in block diagram form, the assignment of ownership for a superseded snapshot. Similar to FIG. 2, reference data collation system 300 of FIG. 3 includes IHS 100, storage array group 140, owner group 210, and current owner group 220. Storage array group 140 includes storage arrays 142, 144, 146, and 148. Storage array 142, 144, 146, and 148 respectively include storage volume 163A-N, 165A-N, 167A-N, and 169A-N. Owner group 210 includes reference data 212, 214, and 216. Owner group 220 includes reference data 222, 224, and 226. Additionally, FIG. 3 includes owner group 330 and compression page 340. Owner group 330 includes reference data 332, 334, and 336.

In one embodiment, owner group 220 maintains reference access to memory page groups associated with owner group 210 and the current volume until the memory page group associated with either owner group are superseded. Storage controller 151 receives real-time data, and writes the data to storage volume 163N as memory pages to form a memory page group. Processor 150 generates owner group 330 to receive reference data 332, 334, 336 for referencing the logical block address for the new memory page group. The new memory pages in the new memory page group supersede respective memory pages and/or memory page group previously stored in storage volume 163N. Accordingly, the respective memory page group previously stored in storage volume 163N and referenced by owner group 210 are eclipsed. More specifically, the new memory pages modified and form memory page groups that are associated with reference data 212, 214, and 216. Therefore, processor 150 assigns ownership of reference data 212, 214, and 216 to owner group 210 and owner group 220, thereby relinquishing reference access to subsequent owner group 210 and 220. In response to storage volume 163N receiving reference data 332, 334, 336, reference data 212, 214, and 216 is no longer accessible by the current volume. Owner group 220 has reference access to reference data 212, 214, and 216 as well as reference data 222, 224, and 226. Owner group 330 has reference access to reference data 222, 224, and 226 of owner group 220, as well as reference access to the current state of storage volume having reference data 332, 334, and 336.

In another embodiment, processor 150 receives a request to compress a memory page group associated with owner group 210 to clean storage volume 163N of storage array 142. Processor 150 selects reference data 212, 214, and 216. Processor 150 determines the memory page groups associated with reference data 212, 214, and 216 are superseded by reference data 222, 224, and 226. Processor 150 compresses the memory page group to form compression page 340 and stores compression page 340 in storage volume 163N.

In still another embodiment, a request is received to delete owner group 210 to clean storage volume 163N of storage array 142. Reference data 212, 214, and 216 are referenced by owner group 210 and owner group 220. Processor 150 deletes owner group 210. However, because owner group 220 retains access to the memory page groups that are associated with reference data 212, 214, and 216, the memory page groups cannot be deleted from storage volume 163N. In this example owner group 220 is the sole owner of reference data 212, 214, and 216. Thus, when a request is received to delete owner group 220, memory page groups associated with reference data 212, 214, and 216 are also deleted. In response to processor 150 deleting all reference to memory page groups associated with reference data 212, 214, and 216, the memory page groups in the respective logical block addresses can also be deleted. Storage controller 151 can repurpose the storage space associated with the respective logical block address.

Figure 4:
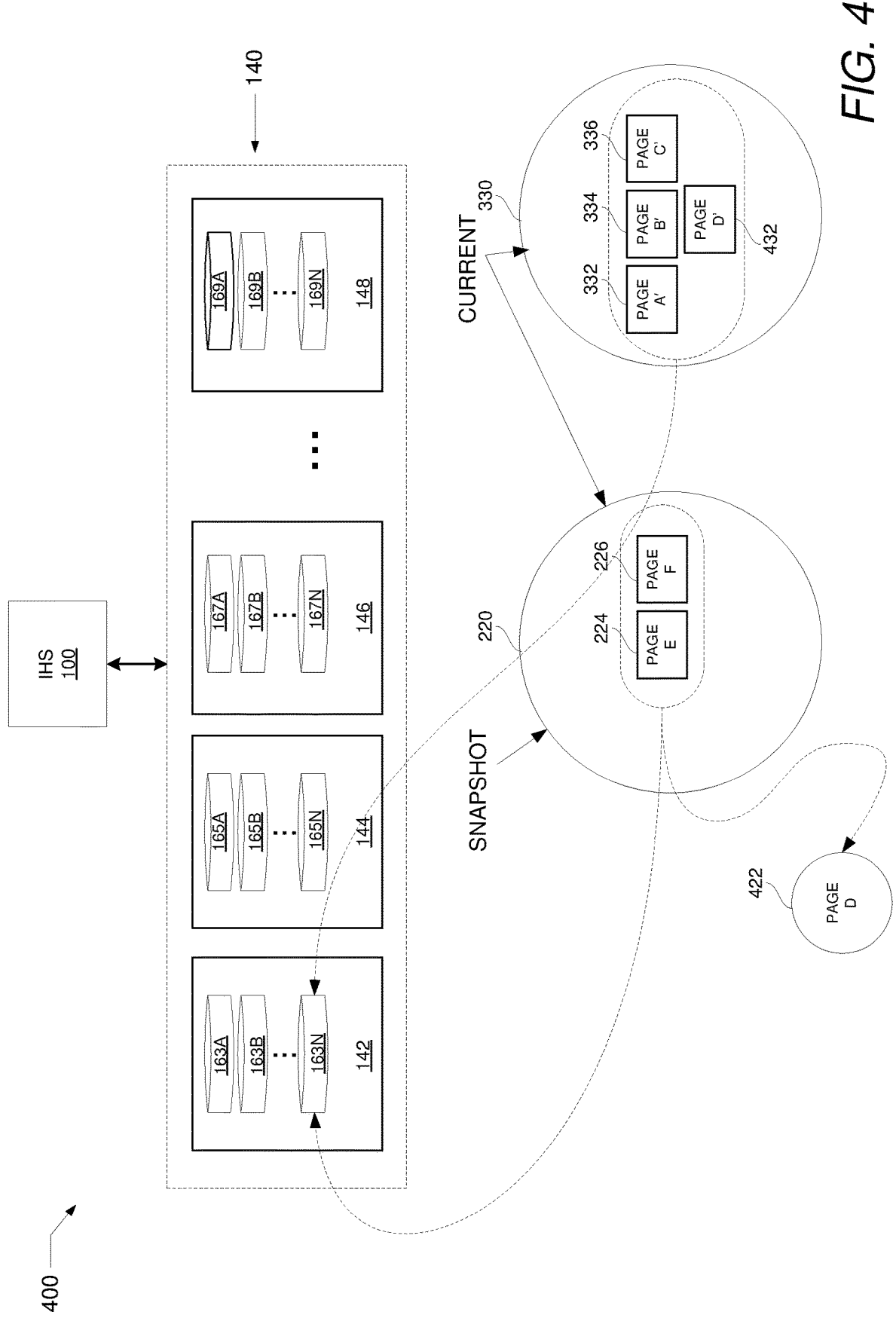
FIG. 4 illustrates, in block diagram form, the assignment of ownership for a superseded memory page group, according to one or more embodiments.

FIG. 4 illustrates, in block diagram form, the assignment of ownership for a superseded memory page group. Reference data collation system 400 of FIG. 4 includes IHS 100, storage array group 140, owner group 220, and owner group 330. Storage array group 140 includes storage arrays 142, 144, 146, and 148. Storage array 142, 144, 146, and 148 respectively include storage volume 163A-N, 165A-N, 167A-N, and 169A-N. Owner group 220 includes reference data 224, 226, and 422. Owner group 330 includes reference data 332, 334, 336, and 432.

In one embodiment, in response to the logical block address associated with a memory page having all owner groups relinquish reference access, the memory page group can be deleted. The current state of the volume, owner group 330, has reference access to real-time data writes as well as reference data 224, 226, and 422 of owner group 220. Storage controller 151 receives reference data 432 and writes reference data 432 to owner group 330. Processor 150 monitors writes to the storage volume and detects when the select storage volume receives a new memory page group that supersedes a previous memory page group. Reference data 432 supersedes the specified memory page group referenced by reference data 422, therefore, owner group 220 is partially superseded. Consequently, a separate owner group is formed having reference data 422. In this example, reference data 422 is solely owned by owner group 220, whereas owner group 220 and owner group 330 have reference access to reference data 224 and 226. Accordingly, in response to a request to delete owner group 220, processor 150 deletes the memory page group associated with reference data 422 and recovers the storage volume space thereof.

Enabling processor 150 to organize real-time data according to reference data collation system 200 provides a more efficient starting point for reads to a selected storage volume. OOSC utility 128 enables writes to storage volume 163N that are organized in the storage volume according to the respective owner. When reads occur on storage volume 163N, the read begins with the most current owner. Storing the memory pages together and deleting the memory pages together enables storage controller 151 to recover usable storage space in the storage volume, and further reduces the need for storage volume cleaning.

Figure 5:
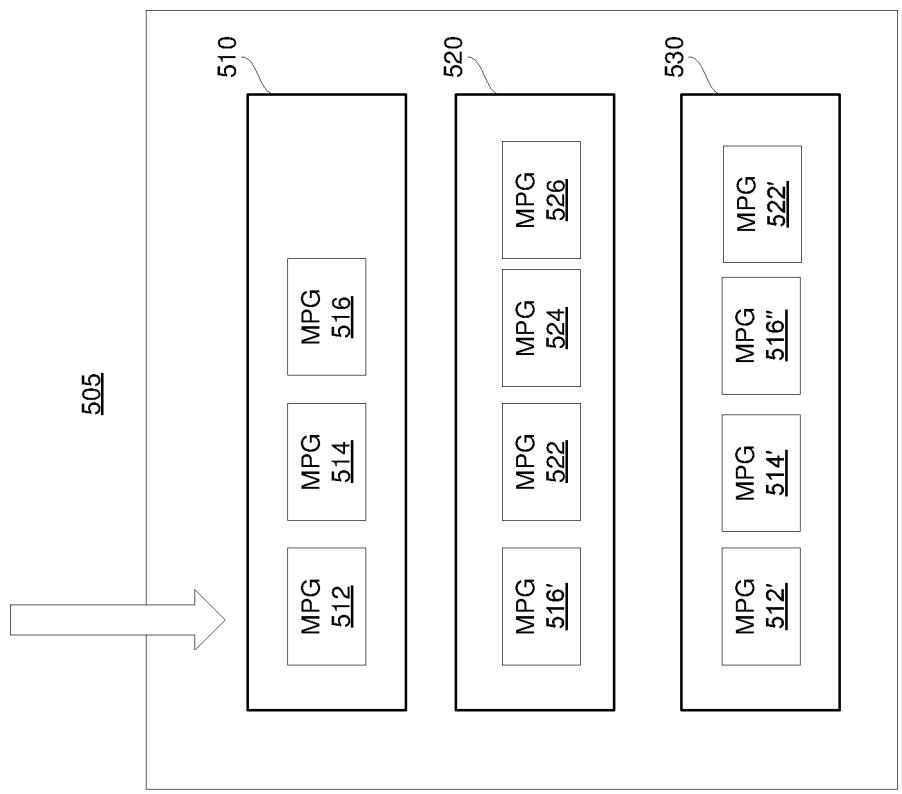
FIG. 5 illustrates, in block diagram form the collection of memory page groups from a storage volume for compression in a storage volume, in accordance with one embodiment.

FIG. 5 illustrates, in block diagram form an example portion of a storage volume which has a plurality of memory snapshots and the current state of the storage volume where new writes are stored. The plurality of snapshots as well as the current state of the volume are each represented by a metadata lookup structure. Storage volume 505 includes snapshot 510 and 520, and current state of the volume 530 which are illustrated having memory page groups which are a reference to a logical block address having the memory page group stored therein. Snapshot 510 includes memory page group 512, 514, and 516. Snapshot 520 includes memory page group 516' 522, 524, and 526. Current state of the storage volume 530 references the current writes to storage volume 505, and includes memory page group 512', 514', 516", and 522'. Memory page groups 512', 514', 516", and 522' respectively supersede memory pages associated with memory page groups 512, 514, 516, 516', and 522; however, in the present example, both the new and superseded forms of memory pages exist in storage volume 505. Memory snapshot 510 has reference access to memory page groups 512, 514, and 516. Memory snapshot 520 has reference access to memory page groups 512, 514, 516', 522, 524, and 526. Current state of the storage volume 530 has reference access to 524, 526, 512', 514', 516", and 522'.

In one embodiment, processor 150, having code provided by OOSC utility 128, selectively collates compression groups that are organized with respect to the owner group associated with the respective memory page group(s). Each owner group has reference access to the memory page group associated with the respective memory snapshot and/or current state of the storage volume. In one example, processor 150 retrieves memory page groups associated with a single owner group that has reference access from storage volume 505 for compression. Processor 150 selects memory page group 516 to compress. Memory page group 516 is compressed and stored as a compressed page in storage volume 505. Memory page group 516 is only owned be memory snapshot 510, and therefore only memory snapshot 510 has reference access to memory page group 516. This means that if memory page group 510 is deleted, the compression storage space containing the compressed form memory page group 516 becomes free, or available for repurposing. The storage space becomes available because memory snapshot 510 is the only memory snapshot that can reference memory page group 516. Consequently, when memory snapshot 510 no longer needs to reference memory group 516, then reference memory group 516 can be deleted from storage volume 505.

In another example, processor 150, having code provided by OOSC utility 128, retrieves memory page groups having reference access associated with multiple owners from storage volume 505 for compression. Processor 150 further selects memory page groups 512 and 514 as a compression group. Memory page groups 512 and 514 are unique memory pages to memory snapshot 510 and memory snapshot 520. Memory snapshots 510 and 520 have reference access to memory page groups 512 and 514. Therefore, because memory page groups 512 and 514 have common owners with common reference access, processor 150 compresses memory page groups 512 and 514 together to form a single compression group having common owner groups which can reference the memory pages. Processor 150 stores the compressed group in storage volume 505. Storage space that includes the compressed form of memory page groups 512 and 514 becomes available when both memory snapshot 510 and 520 are deleted, thereby relinquishing reference access to memory page groups 512 and 514. However, if only memory snapshot 510 is deleted, memory page groups 512 and 514 remain in storage volume 505 until memory snapshot 520 relinquishes access to memory page groups 512 and 514.

In still another example, processor 150 continues to build compression groups by selectively collating memory page groups from storage volume 505. Processor 150, having code provided by OOSC utility 128, retrieves memory page groups associated with memory snapshot 520 and the current state of the storage volume 530. More specifically, memory snapshot 520 and current state of the storage volume 530 have reference access to memory page groups 524 and 526. Accordingly, processor 150 selects memory page groups 524 and 526 for compression.

When memory snapshot 520 is deleted, memory page groups 524 and 526 remain compressed in storage volume 505, because current state of the volume maintains reference access to memory page groups 524 and 526. Processor 150 then selects pages 512', 514', 516", and 522' for compression, and stores the compressed group in storage volume 505. Current state of the storage volume 530 alone has reference access to memory page groups 512', 514', 516", and 522'. Therefore, when current state of the storage volume 530 is deleted, memory page groups 524 and 526 as well as 512', 514', 516", and 522' can also be deleted from the storage volume, thereby allowing storage controller 151 to reclaim the respective portion of storage volume 505 and subsequent cleaning of storage volume 505 is avoided.

Figure 6:
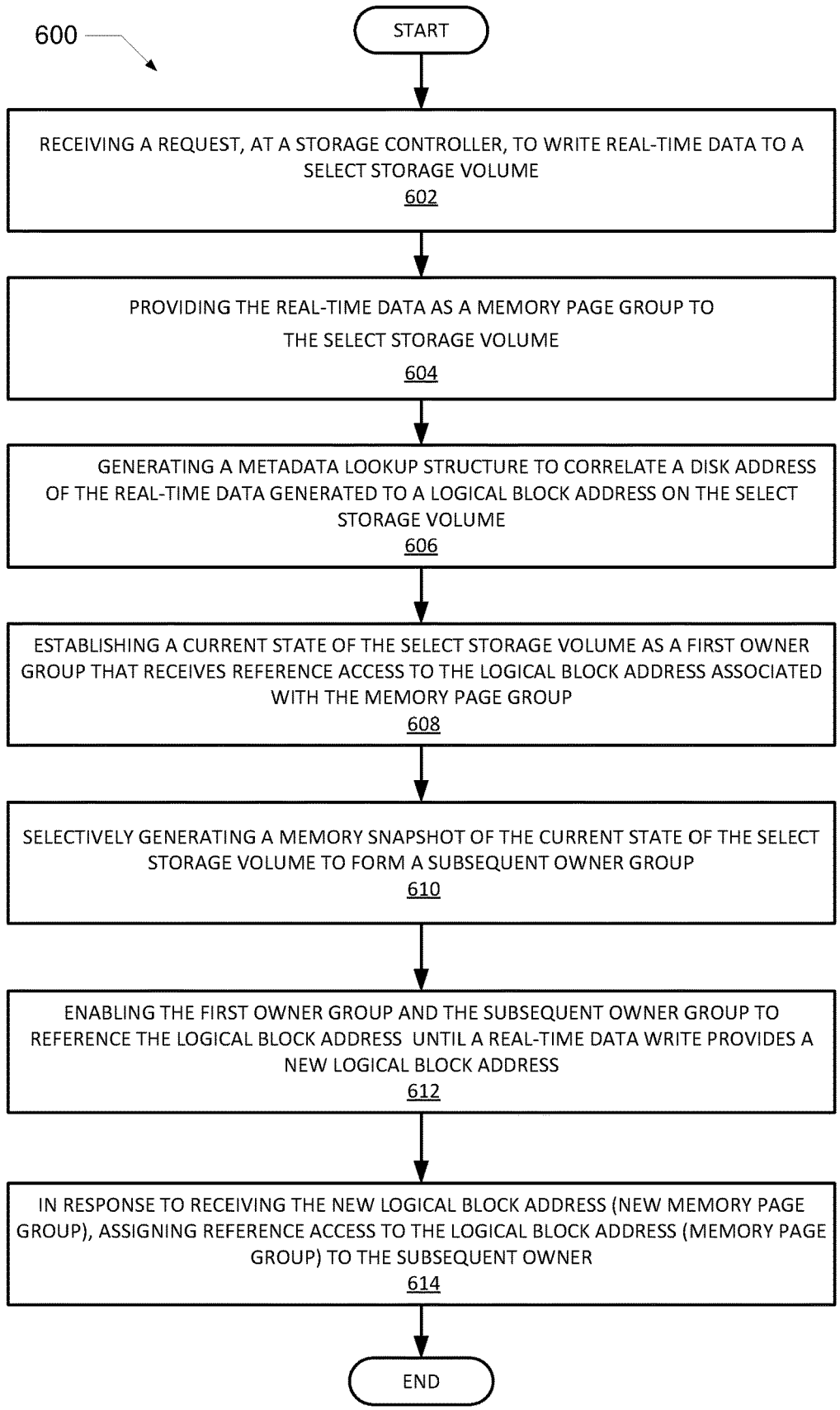
FIG. 6 is flow chart illustrating an example method for storing and selectively organizing memory page groups for compression in the storage volume, according to one or more embodiments.
Figure 7:
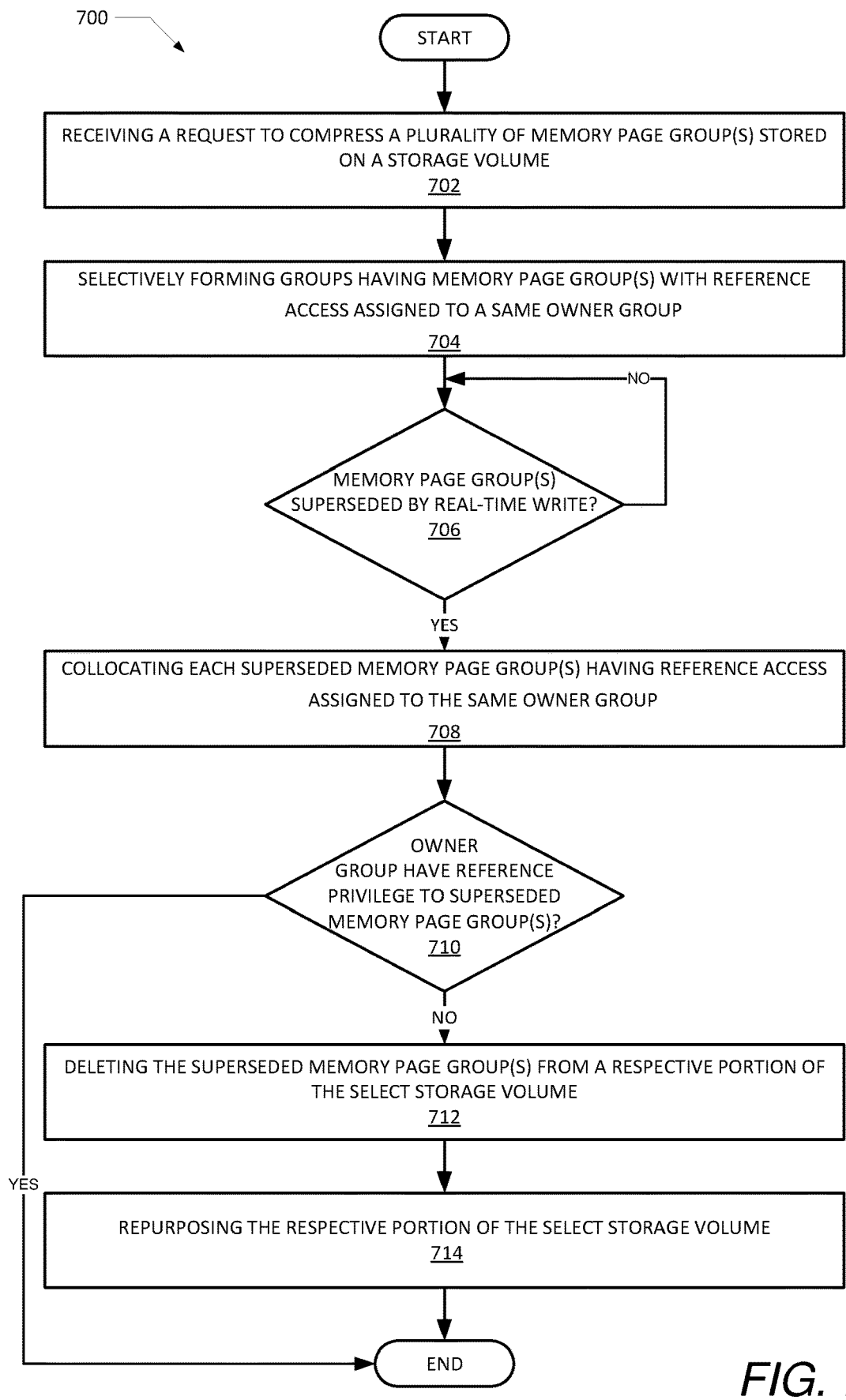
FIG. 7 is a flow chart illustrating an example method for selectively grouping memory page groups in a select storage volume, according to one or more embodiments.

FIG. 6 and FIG. 7 illustrate flowcharts of exemplary methods 600 and 700 by which one or more of storage controller(s), and/or processor 150 within the preceding figures performs different aspects of the processes that enable the one or more embodiments of the disclosure. Generally, method 600 and 700 represent computer-implemented methods for storing and selectively deleting compressed data groups in a memory container. The description of method 600 and 700 are provided with general reference to the specific components illustrated within the preceding FIGS. 1-5. Methods 600 and 700 are described as implemented via processor 150 and particularly the execution by processor 150 of code provided by OOSC utility 128. It is however appreciated that certain aspects of the described methods may be implemented via other processing devices and/or execution of other code.

Turning now to FIG. 6, method 600 begins at the start block and proceeds to block 602. At block 602, processor 150 receives a request, at a storage controller, to write real-time data to a select storage volume. Subsequently, at block 602, processor 150 provides the real-time data in a form of a memory page group to the select storage volume (block 604). Next, at block 606, processor 150 generates a metadata lookup structure to correlate a disk address of the real-time data generated to a logical block address on the select storage volume. Following which, processor 150 establishes a current state of the select storage volume as a first owner group that receives reference access to the logical block address associated with the memory page group, at block 608. Next at block 610, processor 150 selectively generates a memory snapshot of the current state of the select storage volume to form a subsequent owner group. At the next block 612, processor 150 enables the first owner group and the subsequent owner group to reference the logical block address that is associated with the memory page group until a real-time data write provides a new logical block address that is associated with a new memory page group (block 612). In response to receiving the new logical block address that is associated with the new memory page group, at block 614, processor 150 assigns reference access to the logical block address associated with the memory page group to the subsequent owner group. The process concludes at the end block.

Turning now to FIG. 7, method 700 begins at the start block and proceeds to block 702. At block 702, processor 150 receives a request to compress a plurality of memory page group(s) stored on the select storage volume. Processor 150 selectively forms a compression group having memory page group(s) with reference access assigned to a same owner group, at block 704. At block 706 the processor determines if the memory page group(s) is superseded by a real-time write to the storage volume. In response to the memory page(s) not being superseded by a real-time write to the storage volume, returning to block 706. In response to processor 150 determining the memory page group(s) is being superseded by a real-time write to the storage volume collocating each superseded memory page(s) having reference access assigned to the same owner group, at block 708. At block 710, processor 150 determines whether the owner group has reference privilege to the eclipsed memory page group(s). In response to the owner having reference privilege to the superseded memory page group(s), the process ends. In response to the owner not having reference privilege to the superseded memory page group(s), deleting the superseded memory page group(s) from a respective portion of the select storage volume (712). At block 714, processor 150 repurposes the respective portion of the select storage volume. The process concludes at the end block.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for reducing cleaning overhead in a storage array, the method comprising:
   receiving, at a storage controller, a request to write real-time data to a select storage volume;
   providing the real-time data as a memory page group to the select storage volume;
   generating a metadata lookup structure to correlate a disk address of the real-time data to a logical block address on the select storage volume;
   establishing a current state of the select storage volume as a first owner group that receives reference access to the logical block address associated with the memory page group;
   selectively generating a memory snapshot of the current state of the select storage volume to form a subsequent owner group, wherein the memory snapshot preserves access to the logical block address that is associated with the memory page group;
   enabling the first owner group and the subsequent owner group to both reference the logical block address that is associated with the memory page group until a real-time data write provides a new logical block address that is associated with a new memory page group having data that supersedes the memory page group;
   in response to receiving the new logical block address that is associated with the new memory page group, assigning reference access of the logical block address associated with the memory page group to the subsequent owner group, and
   in response to receiving a request to compress a plurality of memory page groups on a storage volume having a plurality of owner groups:
   selectively forming groups having memory page groups with reference access assigned to a same owner group; and
   compressing the memory page groups having reference access assigned to the same owner group, and
   deleting the compressed data group from a respective portion of the storage volume in response to each owner of the same owner group relinquishing reference access to the superseded memory page group.

2. The method of claim 1, further comprising:
   relinquishing reference access of the first owner group to the memory page group, when the new memory page group supersedes the memory page group; and
   assigning reference access of the new logical block address associated with the new memory page group to the first owner group.

3. The method of claim 1, further comprising:
   detecting when the select storage volume receives the new memory page group that supersedes the memory page group; and
   in response to detecting the new memory page group, enabling the subsequent owner group to maintain reference access to the memory page group.

4. The method of claim 1, further comprising:
   receiving a request to delete the subsequent owner group; and
   in response to receiving the request to delete the subsequent owner group:
      determining which owner groups have reference access to the logical block address associated with the memory page group;
      in response to determining reference access has been removed from all owner groups, removing the memory page group from a respective portion of the select storage volume; and
      repurposing the respective portion of the select storage volume.

5. The method of claim 4, further comprising:
   enabling the subsequent owner group to retain reference access to the logical block address associated with the memory page group until reference access has been removed from all owner groups.

6. The method of claim 1, further comprising:
   receiving a request to read data associated with an owner group; and
   retrieving a metadata lookup structure associated with the owner group.

7. The method of claim 1, further comprising:
   storing the compressed memory page groups as a compressed data group in the storage volume.

8. The method of claim 1, further comprising:
in response to receiving a request to compress a plurality of memory page groups:
  determining when a real-time data write supersedes a memory page group in the select storage volume;
  in response to the determining, collocating each superseded memory page group having reference access assigned to the same owner group; and
  generating the compressed data group having each superseded memory page group compressed therein.

9. The method of claim 8, further comprising:
repurposing the respective portion of the storage volume, in response to deletion of the superseded memory page group.

10. An information handling system (IHS) comprising:
a storage array;
a storage controller associated with the storage array;
a processor communicatively coupled to the storage controller and which executes an owner organized storage compression utility, which enables the processor to:
receive, at a storage controller, a request to write real-time data to a select storage volume;
provide the real-time data as a memory page group to the select storage volume;
generate a metadata lookup structure to correlate a disk address of the real-time data to a logical block address on the select storage volume;
establish a current state of the select storage volume as a first owner group that receives reference access to the logical block address associated with the memory page group;
selectively generate a memory snapshot of the current state of the select storage volume to form a subsequent owner group, wherein the memory snapshot preserves access to the logical block address that is associated with the memory page group;
enable the first owner group and the subsequent owner group to both reference the logical block address that is associated with the memory page group until a real-time data write provides a new logical block address that is associated with a new memory page group having data that supersedes the memory page group;
in response to receiving the new logical block address that is associated with the new memory page group, assign reference access of the logical block address associated with the memory page group to the subsequent owner group; and
in response to receiving a request to compress a plurality of memory page groups on a storage volume having a plurality of owner groups:
  selectively form groups having memory page groups with reference access assigned to a same owner group; and
  compress the memory page groups having reference access assigned to the same owner group,
  deletes the compressed data group from a respective portion of the storage volume only in response to each owner of the same owner group relinquishing reference access to the superseded memory page group.

11. The IHS of claim 10, wherein the processor:
relinquishes reference access of the first owner group to the memory page group, when the new memory page group supersedes the memory page group; and
assigns reference access of the new logical block address associated with the new memory page group to the first owner group.

12. The IHS of claim 10, wherein the processor:
detects when the select storage volume receives the new memory page group that supersedes the memory page group; and
in response to detecting the new memory page group, enabling the subsequent owner group to maintain reference access to the memory page group.

13. The IHS of claim 10, wherein the processor:
in response to receiving a request to delete the subsequent owner group:
  determines which owner groups have reference access to the logical block address associated with the memory page group;
  in response to determining reference access has been removed from all owner groups, removes the memory page group from a respective portion of the select storage volume; and
  repurpose the respective portion of the select storage volume.

14. The IHS of claim 13, wherein the processor:
enables the subsequent owner group to retain reference access to the logical block address associated with the memory page group until reference access has been removed from all owner groups.

15. The IHS of claim 10, wherein the processor:
receives a request to read data associated with an owner group; and
retrieves a metadata lookup structure associated with the owner group.

16. The HIS of claim 10, wherein the processor:
stores the memory page groups as a compressed data group in the storage volume,
wherein storage space that includes the compressed form of the memory page groups becomes available when all associated memory snapshots are deleted, thereby relinquishing reference access to the memory page groups, wherein when only one of multiple memory snapshots is deleted, the memory page groups remain in storage volume until a remaining memory snapshot relinquishes access to the memory page groups.

17. The IHS of claim 10, wherein the processor:
in response to receiving a request to compress a plurality of memory page groups:
  determines when a real-time data write supersedes a memory page group in the select storage volume;
  collocates each superseded memory page group having reference access assigned to the same owner group; and
  generates the compressed data group having each superseded memory page group compressed therein.

18. The IHS of claim 17, wherein the processor:
repurposes the respective portion of the select storage volume, in response to deletion of the superseded memory page group.

* * * * *